United States Patent
Fici et al.

(10) Patent No.: US 10,775,803 B2
(45) Date of Patent: Sep. 15, 2020

(54) DOCKING SYSTEM AND METHOD FOR CHARGING A MOBILE ROBOT

(71) Applicants: TELECOM ITALIA S.p.A., Milan (IT); POLITECNICO DI TORINO, Turin (IT)

(72) Inventors: Gian Piero Fici, Turin (IT); Marco Gaspardone, Turin (IT); Miguel Efrain Kaouk Ng, Turin (IT); Matteo Lazzarin, Turin (IT)

(73) Assignees: TELECOM ITALIA S.p.A., Milan (IT); POLITECNICO DI TORINO, Turin (IT)

(*) Notice: Subject to any disclaimer, the term of this patent is extended or adjusted under 35 U.S.C. 154(b) by 98 days.

(21) Appl. No.: 16/064,866

(22) PCT Filed: Dec. 30, 2015

(86) PCT No.: PCT/EP2015/081406
§ 371 (c)(1),
(2) Date: Jun. 21, 2018

(87) PCT Pub. No.: WO2017/114571
PCT Pub. Date: Jul. 6, 2017

(65) Prior Publication Data
US 2018/0373258 A1 Dec. 27, 2018

(51) Int. Cl.
*G05D 1/02* (2020.01)
*H02J 7/00* (2006.01)

(52) U.S. Cl.
CPC ......... *G05D 1/0225* (2013.01); *G05D 1/0231* (2013.01); *G05D 1/0276* (2013.01);
(Continued)

(58) Field of Classification Search
None
See application file for complete search history.

(56) References Cited

U.S. PATENT DOCUMENTS 7,332,890 B2  2/2008  Cohen et al.
7,546,179 B2  6/2009  Lee
(Continued)

FOREIGN PATENT DOCUMENTS

CA    2 935 640 A1   7/2015
EP    1 746 477 A2   1/2007
(Continued)

OTHER PUBLICATIONS

International Search Report dated Sep. 2, 2016 in PCT/EP2015/081406 filed Dec. 30, 2015.

*Primary Examiner* — Ryan Rink
(74) *Attorney, Agent, or Firm* — Oblon, McClelland, Maier & Neustadt, L.L.P.

(57) ABSTRACT

A docking system and method for charging a mobile robot at a docking station. The system includes a first module for the robot, including a first communication unit and a first control unit, and a second module for the station, including a second communication unit, one or more docking sensors, and a second control unit. When the robot enters a docking region around the station, the first communication unit sends to the second communication unit a status message indicating that the robot needs charging; upon reception of the status message, the second control unit uses the sensors to derive a traction command to drive the robot towards the station; and the second communication unit sends to the first communication unit a command message containing the traction command. The first control unit processes the traction command and uses it to operate traction motors of the robot.

15 Claims, 3 Drawing Sheets

(52) U.S. Cl.
CPC .......... *G05D 1/0282* (2013.01); *H02J 7/0047* (2013.01); *H02J 7/00034* (2020.01); *H02J 7/00045* (2020.01)

(56) References Cited

U.S. PATENT DOCUMENTS

| | | | |
|---|---|---|---|
| 9,139,310 B1* | 9/2015 | Wang | B64F 1/36 |
| 9,717,387 B1* | 8/2017 | Szatmary | A47L 9/009 |
| 10,481,607 B2* | 11/2019 | Dumitras | B65F 1/1468 |
| 2007/0018081 A1 | 1/2007 | Kim | |
| 2008/0065266 A1 | 3/2008 | Kim | |
| 2010/0324736 A1* | 12/2010 | Yoo | G05D 1/0225 700/259 |
| 2011/0142099 A1* | 6/2011 | Poncelet born Morey | G05D 1/0225 375/147 |
| 2012/0323365 A1* | 12/2012 | Taylor | B25J 19/005 700/259 |
| 2015/0032259 A1* | 1/2015 | Kim | A47L 9/2805 700/255 |
| 2017/0344014 A1* | 11/2017 | Wu | B25J 5/007 |
| 2017/0344028 A1* | 11/2017 | Westermo | B25J 5/02 |
| 2019/0009408 A1* | 1/2019 | Szatmary | G06N 3/049 |
| 2019/0025846 A1* | 1/2019 | Wu | G08G 1/202 |

FOREIGN PATENT DOCUMENTS

| | | |
|---|---|---|
| EP | 2 617 531 A1 | 7/2013 |
| EP | 2 865 622 A1 | 4/2015 |
| WO | WO 2014/114910 A1 | 7/2014 |

* cited by examiner

DOCKING SYSTEM AND METHOD FOR CHARGING A MOBILE ROBOT

TECHNICAL FIELD

The present invention relates to the field of mobile robots. In particular, the present invention relates to a docking system and method for charging a mobile robot.

BACKGROUND ART

Mobile robots are nowadays becoming popular for performing simple and repetitive tasks, such as household maintenance (floor cleaning), or dangerous tasks, for instance inspection or surveillance activities inside environments where humans are at risk.

Typically, mobile robots may be controlled remotely by a human operator or they may operate autonomously. This latter type of operation implies that the mobile robot is capable of autonomous indoor navigation, which means that the robot is capable of creating a map of the indoor environment, determining its localization within the map and planning a path to navigate point-to-point within the map.

Generally, an autonomous mobile robot may be provided with electric traction motors. In this case, it is also provided with an on-board power unit (i.e. a battery) that is periodically recharged. Recharging is performed at a docking station connected to the electric power distribution network. When the on-board battery is to be recharged, the autonomous mobile robot typically moves towards the docking station. In the vicinity of the docking station, the mobile robot starts a docking operation according to which the mobile robot determines the exact position of the docking station and generates motion commands for its traction motors, in order to approach the docking station and connect to it. Typically, the position of the docking station may be determined by the mobile robot by detecting, through appropriate sensors, signals emitted by the docking station, which may comprise infrared beacons and light signals, or by recognizing reference images or visual markers located on the docking station, or by detecting an audio marker emitted by the docking station or by a sound source in the vicinity of the docking station.

WO2014/114910 discloses a docking station for a mobile robot comprising a base portion that is locatable on a floor surface and a rear portion that is pivotable with respect to the base portion, thereby permitting a user to place the docking station on the floor in an unfolded configuration but to store the docking station in a folded configuration.

EP2617531A1 discloses an intelligent robot system comprising an intelligent robot and a charging base. The intelligent robot comprises a docking electrode, a walking mechanism and a control unit. The docking electrode, the walking mechanism and the control unit are disposed in the body of the intelligent robot. The charging base comprises a charging electrode disposed on the body of the charging base. The intelligent robot further comprises a gripping mechanism. When the docking electrode and the charging electrode dock successfully, the control unit controls the gripping mechanism to lock the walking mechanism to enable the intelligent robot to maintain a successful docking state in the charging base, preventing the charging electrode of the charging base from being separated from the docking electrode due to the improper movement of the walking mechanism. Any interference during of the intelligent robot is thus prevented and charging efficiency is improved.

U.S. Pat. No. 7,546,179 discloses a method and apparatus allowing a mobile robot to return to a designated location the method including: calculating a first direction angle of the mobile robot at a second location arrived at after the mobile robot travels a predetermined distance from the first location; determining whether the mobile robot approaches or moves away from the designated location, at a third location arrived at after the mobile robot rotates by the first direction angle and then travels a predetermined distance; and if the result of the determination indicates that the mobile robot approaches the docking station, controlling the mobile robot to travel according to the first direction angle, and if the result indicates the mobile robot moves away from the docking station, calculating a second direction angle of the mobile robot at the third location, and controlling the mobile robot to travel according to the second direction angle.

U.S. Pat. No. 7,332,890 discloses a method for energy management in a robotic device includes providing a base station for mating with the robotic device, determining a quantity of energy stored in an energy storage unit of the robotic device, and performing a predetermined task based at least in part on the quantity of energy stored. Also disclosed are systems for emitting avoidance signals to prevent inadvertent contact between the robot and the base station, and systems for emitting homing signals to allow the robotic device to accurately dock with the base station.

SUMMARY OF THE INVENTION

The Applicant has noticed that known systems and methods for charging a mobile robot have some drawbacks.

In particular, the Applicant has noticed that the mobile robot often does not correctly dock on the docking station at its first attempt. This may be due to the fact that when the mobile robot is docking on the docking station, its movements may be imprecise because of a number of factors. These factors may include:

- inaccuracies in the docking station geometry model, which affect the autonomous navigation algorithms;
- lack of reference signals and markers at a reduced distance between the mobile robot and the docking station;
- fluctuations of the intensity of the reference signals and markers during the docking operation; and
- low battery level of the on-board power unit.

These factors may negatively impact on the docking operation as the robot may be forced to repeat the operation of localizing the docking station and the manoeuvres for approaching it and connecting to it. Repeating the docking operation disadvantageously may reduce the charging level of the on board battery of the mobile robot to a value that does not allow the mobile robot to complete the procedure and dock on the docking station. The mobile robot may even go dead before docking on the docking station, which implies that a human operator shall reach the mobile robot and carry it to the docking station for recharging. This is clearly inefficient and time consuming.

Moreover, typically, in order to carry out the docking operation the mobile robot should switch on one or more sensors and keep them switched on until the procedure gets completed. Sensors may comprise a laser scanner, an infrared sensor, a videocamera, an ultrasonic sensor. This implies that the mobile robot is consuming a large amount of energy during the docking operation and that the on board battery of the mobile robot may discharge quickly, hence reducing the time interval that is available for completing the docking operation.

In view of the above, the Applicant has tackled the problem of providing a docking system and method for charging a mobile robot which allows minimizing the energy consumption of the robot during the docking operations. Minimizing the energy consumption would allow the mobile robot to complete the docking operation even in presence of one or more of the factors listed above (inaccuracies in the docking station geometry model, lack or fluctuations of reference signals at reduced distances, low battery level).

According to a first aspect, the present invention provides a docking system for charging a mobile robot at a docking station, the system comprising a first module configured to be installed on board the mobile robot, and a second module configured to be installed on board the docking station, the first module comprising a first communication unit and a first control unit, the second module comprising a second communication unit, one or more docking sensors and a second control unit, wherein:

when the mobile robot enters a docking region around the docking station, the first communication unit is configured to send to the second communication unit a status message indicating that the mobile robot needs charging;

the second control unit is configured to, upon reception of the status message, use the one or more docking sensors to derive, on the basis of data received by the one or more docking sensors, a traction command to drive the mobile robot towards the docking station; and the second communication unit is configured to send to the first communication unit a command message containing the traction command, and wherein the first control unit is configured to process the traction command and use it to operate one or more traction motors of the mobile robot.

Preferably, the second communication unit is configured to, upon reception of the status message, send to the first communication unit an acknowledgment message.

Preferably, the second control unit is further configured to command switching off a number of components of the mobile robot, while keeping switched on at least the first module, the one or more traction motors and circuitries driving them.

According to an embodiment of the present invention, the second control unit is configured to, upon reception of the status message, switch on the one or more docking sensors.

Preferably, the data received by the one or more docking sensors comprise a distance and an orientation between the mobile robot and the docking station, wherein the command message comprises a translational speed and/or a rotational speed to be actuated by the one or more traction motors of the mobile robot, the translational speed being computed on the basis of the distance and the rotational speed being computed on the basis of the orientation.

Preferably, the status message and the command message are messages according to a robot operating system.

According to embodiments of the present invention:

the second control unit is further configured to cyclically derive, on the basis of further data received by the one or more docking sensors, a further traction command;

the second communication unit is further configured to cyclically send to the first communication unit a further command message containing the further traction command; and the first control unit is further configured to cyclically process the further traction command and use it to operate the one or more traction motors of the mobile robot, until the mobile robot docks on the docking station.

Preferably, the first module comprises a first power handling unit with first electrical contacts configured to establish an electrical connection with second electrical contacts of a second power handling unit of the second module when the mobile robot docks on the docking station.

Preferably, the first communication unit and the second communication unit are configured to establish a connection according to a wireless communication technology, the wireless communication technology being one of Bluetooth®, WiFi, 4G LTE. Alternatively or in addition, the first communication unit and the second communication unit are configured to establish a connection through a cloud computing platform.

According to a second aspect, the present invention provides a method for charging a mobile robot at a docking station, the method comprising:

a) when the mobile robot enters a docking region around the docking station, sending by the mobile robot to the docking station a status message indicating that the mobile robot needs charging;

b) at the docking station, upon reception of the message, using one or more docking sensors to derive, on the basis of data received by the one or more docking sensors, a traction command to drive the mobile robot towards the docking station;

c) at the docking station, sending to the mobile robot a command message containing the traction command; and d) at the mobile robot, processing the traction command and using it to operate one or more traction motors of the mobile robot Preferably, the method further comprises, at the docking station, upon reception of the status message, sending to the mobile robot an acknowledgment message, and, at the mobile robot, upon reception of the acknowledgment message, switching off a number of components of the mobile robot, while keeping switched on at least the first module, the one or more traction motors and circuitries driving them.

Preferably, steps b to d are cyclically repeated until the mobile robot docks on the docking station.

More preferably, steps b to d are cyclically repeated until first electrical contacts of the mobile robot establish an electrical connection with second electrical contacts of the docking station.

Preferably, the docking region is a circular region around the docking station of radius comprised between 1 m and 10 m.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
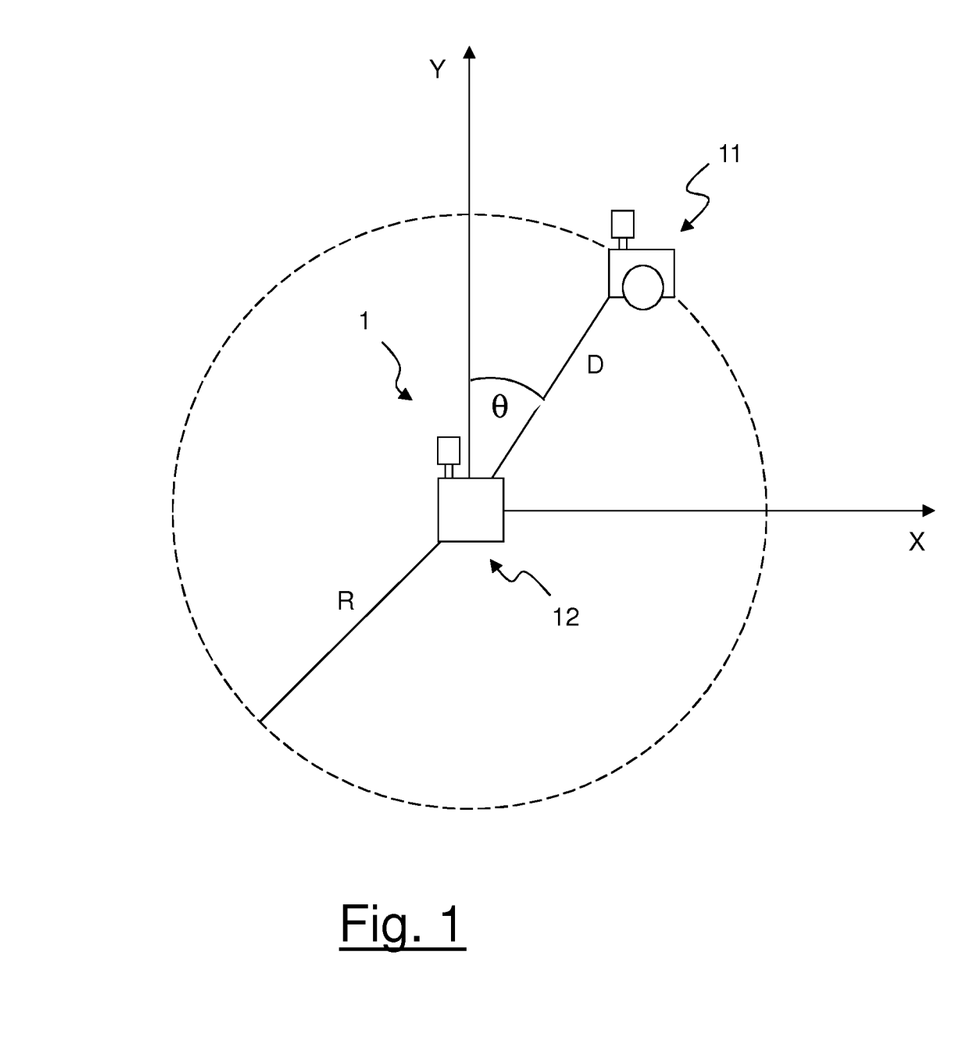
FIG. 1 schematically shows a docking station and a mobile robot in a reference Cartesian coordinate system.

The present invention applies to a robotic system including a mobile robot and a docking station. An exemplary robotic system 1 is represented in FIG. 1, comprising a mobile robot 11 and a docking station 12. In FIG. 1, the system 1 is represented within reference Cartesian coordinate axes X, Y whose origin coincides with the location of the docking station. The mobile robot 11 is at a distance D from the docking station 12, the distance D being variable with time, and has an orientation θ with respect to the docking station 12, the orientation θ being computed as the angle, variable with time, between a reference coordinate axis, for instance the Y axis, and the straight line joining the docking station 12 and the mobile robot 11.

As generally known in the art, the mobile robot may comprise one or more electric traction motors for operating traction members allowing the robot to perform translational and rotational movements. The traction members may include one or more pairs of wheels, or a pair of tracks, or robotic legs (in humanoid robots). The tractions members enable the mobile robot to move in a forward and a reverse direction and to follow a curved path. The mobile robot 11 is also provided with a rechargeable power source, such as a 12V on-board battery, configured to supply power to the mobile robot components, in particular to the traction motors. Further, the mobile robot 11 may comprise a powerboard that is connected to the rechargeable power source and provides the necessary power to the mobile robot components. The mobile robot 11 may comprise other components that are not described here as they are not relevant to the present description.

The mobile robot 11 to which the present invention applies is autonomous in that it includes an autonomous navigation unit that enables it to autonomously navigate the environment in which it is located. The autonomous navigation unit of the mobile robot 11 comprises a processor (or microprocessor) and one or more navigation sensors. The navigation sensors provide navigation data to the processor of the navigation unit for calculating the position of the mobile robot 11 inside the considered environment and determining the mobile robot route according to a known autonomous navigation algorithm. Known algorithms for autonomous navigation may comprise Adaptive Monte Carlo Localization (AMCL), Rapidly Exploring Random Tree (RRT), Smooth Nearness Diagram (SND), Vector Field Histogram (VFH). The one or more navigation sensors may comprise a laser scanner. An exemplary laser scanner that may be used is the UTM-30LX laser scanner by Hokuyo Automatic Co., LTD.

It should be noted that autonomous navigation algorithms and navigation sensors are generally known in the art. As these components do not form part of the present invention, a more detailed description of the autonomous navigation algorithms and navigation sensors will be omitted here.

Moreover, the docking station 12 is preferably attached to an electrical power distribution network.

The mobile robot 11 and the docking station 12 are configured to be associated one with the other so that the mobile robot 11 may recharge its power source when the power level of the power source is below a given threshold. In particular, the docking system and method of the present invention provide for driving the mobile robot 11 towards the docking station until it connects to it. For the application of the docking method and the operation of the docking system, it is assumed that the mobile robot 11 has autonomously reached a "docking region" in the proximity of the docking station. A "docking region" within the meaning of the present invention is a circular area of radius R around the docking station. Preferably, the radius R of the docking region is equal to a value ranging from few meters (e.g. 1 m) to 10 meters.

Figure 2:
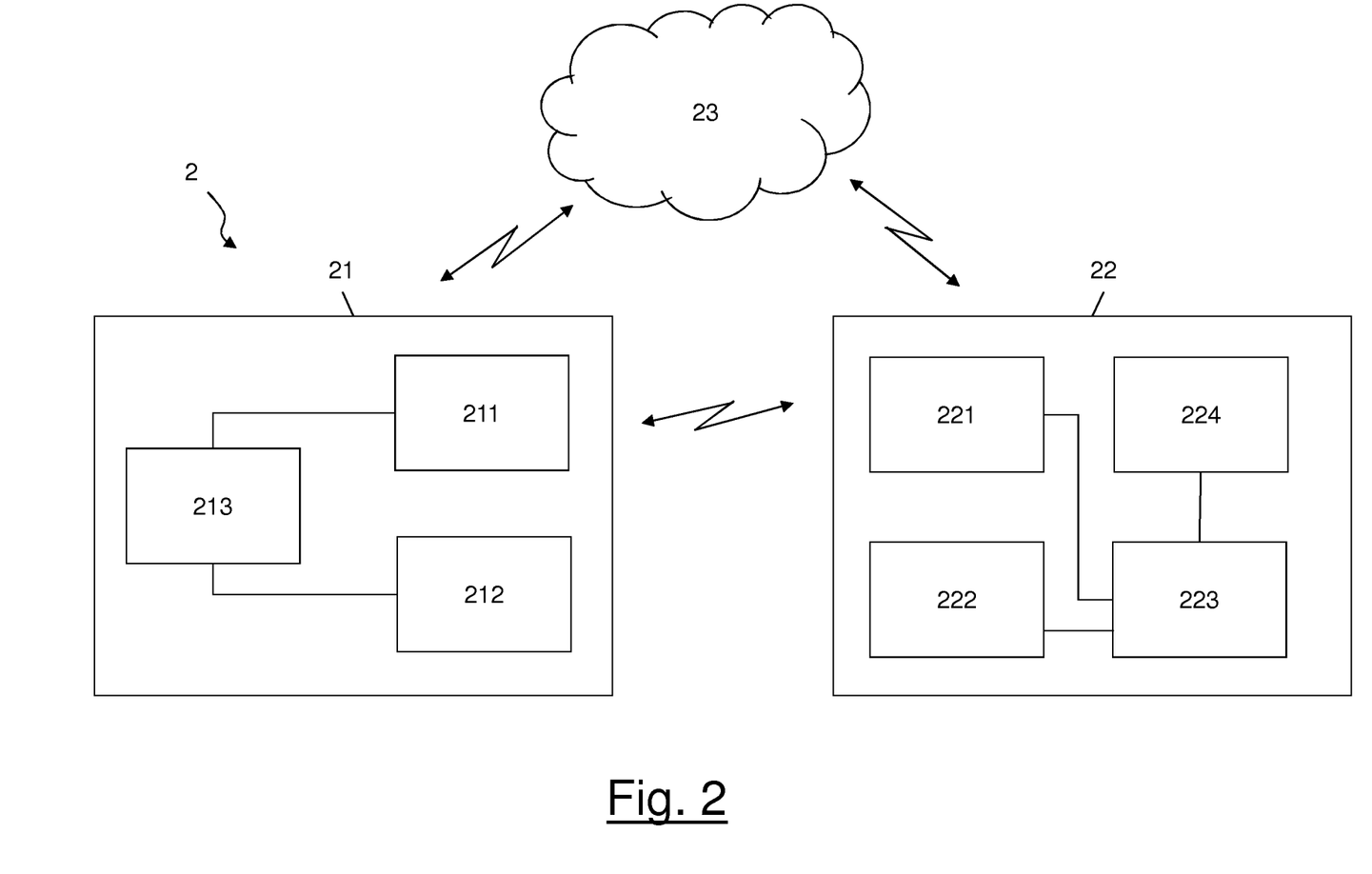
FIG. 2 shows a block scheme of an exemplary docking system for charging the mobile robot according to the present invention.

FIG. 2 shows a block scheme of a docking system 2 for charging the mobile robot according to an embodiment of the present invention. The system 2 preferably comprises a first module 21 to be associated with the mobile robot 11 and a second module 22 to be associated with the docking station 12. In particular, the first module 21 is preferably positioned on board the mobile robot 11. The second module 22 is preferably positioned on board the docking station 12.

The first module 21 preferably comprises a first communication unit 211, a first power handling unit 212 and a first control unit 213. The first communication unit 211 is preferably connected to the first control unit 213 which is in turn connected to the first power handling unit 212. The first communication unit 211 preferably comprises a wireless interface configured to transmit and receive wireless signals to/from a corresponding unit comprised within the second module 22 of the docking station 12, as it will be described in greater detail herein after.

The second module 22 preferably comprises a second communication unit 221, a second power handling unit 222, a second control unit 223 and one or more docking sensors 224. The second communication unit 221 is preferably connected to the second control unit 223, which is in turn connected to the second power handling unit 222 and to the one or more docking sensors 224. The second communication unit 221 preferably comprises a wireless interface configured to transmit and receive wireless signals to/from the first communication unit 211 comprised within the first module 21 of the mobile robot 11, as it will be described in greater detail herein after.

The first communication unit 211 and the second communication unit 221 are preferably configured to exchange information and commands in the form of messages carried by wireless signals over a wireless bidirectional communication link which is established between them. The communication link may be a direct communication link established between the first communication unit 211 and the second communication unit 221 through a wireless communication technology such as Bluetooth® or WiFi. For instance, the first communication unit 211 and the second communication unit 221 may each connect to an external WiFi hotspot in order to establish a connection. In case the Bluetooth® or WiFi technology is used, the first communication unit 211 and the second communication unit 221 may each comprise a dedicated antenna. Alternatively or in addition, the first communication unit 211 and the second communication unit 221 may each comprise an 4G LTE (Long Term Evolution) module which provides a 4G LTE connection. Further alternatively or in addition, the first communication unit 211 and the second communication unit 221 may be remotely connected to a cloud computing platform 23 and they may establish a connection through the cloud platform. In this case, each of the first communication unit 211 and the second communication 221 comprises a respective independent cloud agent, which is connected to the cloud platform 23 though a wireless communication technology such as WiFi or 4G LTE. The cloud platform 23 may be installed on a remote server or it may be distributed on a number of servers.

The first power handling unit 212 preferably comprises an electric circuit configured to receive a supply voltage for charging the mobile robot 11 when the mobile robot 11 is connected to the docking station 12. The first power handling module 212 further comprises a mechanical structure which allows to physically connect the mobile robot 11 to the docking station 12. Moreover, the first power handling unit 212 comprises first electrical contacts that provide an electrical connection with corresponding contacts on the docking station 12 when the mobile robot 11 docks on the docking station 12.

The second power handling unit 222 preferably comprises an electric circuit configured to provide the supply voltage for charging the mobile robot 11 when the mobile robot 11 is connected to the docking station 12. The supply voltage is retrieved from the electrical power distribution network. The second power handling module 222 further comprises a mechanical structure which is configured to engage with the corresponding mechanical structure of the first power handling module 212 in order to physically connect the mobile robot 11 to the docking station 12. Moreover, the second power handling unit 222 comprises second electrical contacts that provide an electrical connection with the corresponding contacts on the mobile robot 11 when the mobile robot 11 docks on the docking station 12.

According to an embodiment of the present invention, the first power handling module 212 may comprise a flat surface mechanical structure having a set of electrical contacts in the form of couples of pins of a elongated shape, which protrude, at least partially, from the external surface of the mobile robot 11. Moreover, the second power handling module 222 may comprise a mechanical structure having a convex surface with electrical contacts in the form of metallic elongated bands. The contacting bands should be positioned on the exterior of the docking station 12 so as to allow contacting the pins of the mobile robot 11 when the mobile robot 11 docks on the docking station 12.

The electrical contacts described above advantageously allow accommodating a range of lateral and angular misalignments between the mobile robot 11 and the docking station 12 when the mobile robot 11 docks on the docking station 12.

The first control unit 213 is preferably configured to process traction commands received by the mobile robot 11 from the docking station 12 through the first communication unit 211 and the second communication unit 221, the traction commands comprising information related to translational and/or rotational movements that the mobile robot 11 should perform in order to approach the docking station 12. The first control unit 213 is further preferably configured to, on the basis of the traction commands, generate corresponding control signals to operate the traction motors of the mobile robot 11 so that the mobile robot 11 may approach the docking station 12 and connect to it, as it will be described in greater detail herein after. Furthermore, the first control unit 213 is configured to communicate with the powerboard of the mobile robot 11 for switching on and off the mobile robot components.

The second control unit 223 is preferably configured to iteratively compute a distance and an orientation between the docking station 12 and the mobile robot 11 while the mobile robot is approaching the docking station 12, as it will be described in greater detail herein after. Furthermore, the second control unit 223 is configured to, on the basis of the distance and orientation of the mobile robot 11 with respect to the docking station 12, generate the traction commands that are required for driving the mobile robot 11 towards the docking station 12 until it docks on the docking station 12.

The computation of the distance and orientation of the mobile robot 11 with respect to the docking station 12 is preferably performed by the second control unit 223 on the basis of data sensed by the one or more docking sensors 224 installed on board the docking station 12. Each sensor of the one or more sensors 224 installed on board the docking station 12 is preferably configured to, when switched on, emit a respective docking signal within the surrounding environment allowing to compute the distance and orientation of the mobile robot so that the docking station 12 may drive the mobile robot 11 to reach the docking station 12 and connect to it, as it will be described in greater detail herein after. These one or more sensors 224 may comprise one or more of: a light sensor, such as a laser scanner, an infrared proximity sensor, such as a PIR (Passive InfraRed) sensor, a ultrasonic sensor, a videocamera. According to a preferred embodiment of the present invention, the docking station 12 comprises a laser scanner as docking sensor. An exemplary laser scanner that may be used on board the docking station is the UTM-30LX laser scanner by Hokuyo Automatic Co., LTD The docking method for charging the mobile robot 11 according to the present invention will be now described with reference to the flow chart of FIG. 3.

Figure 3:
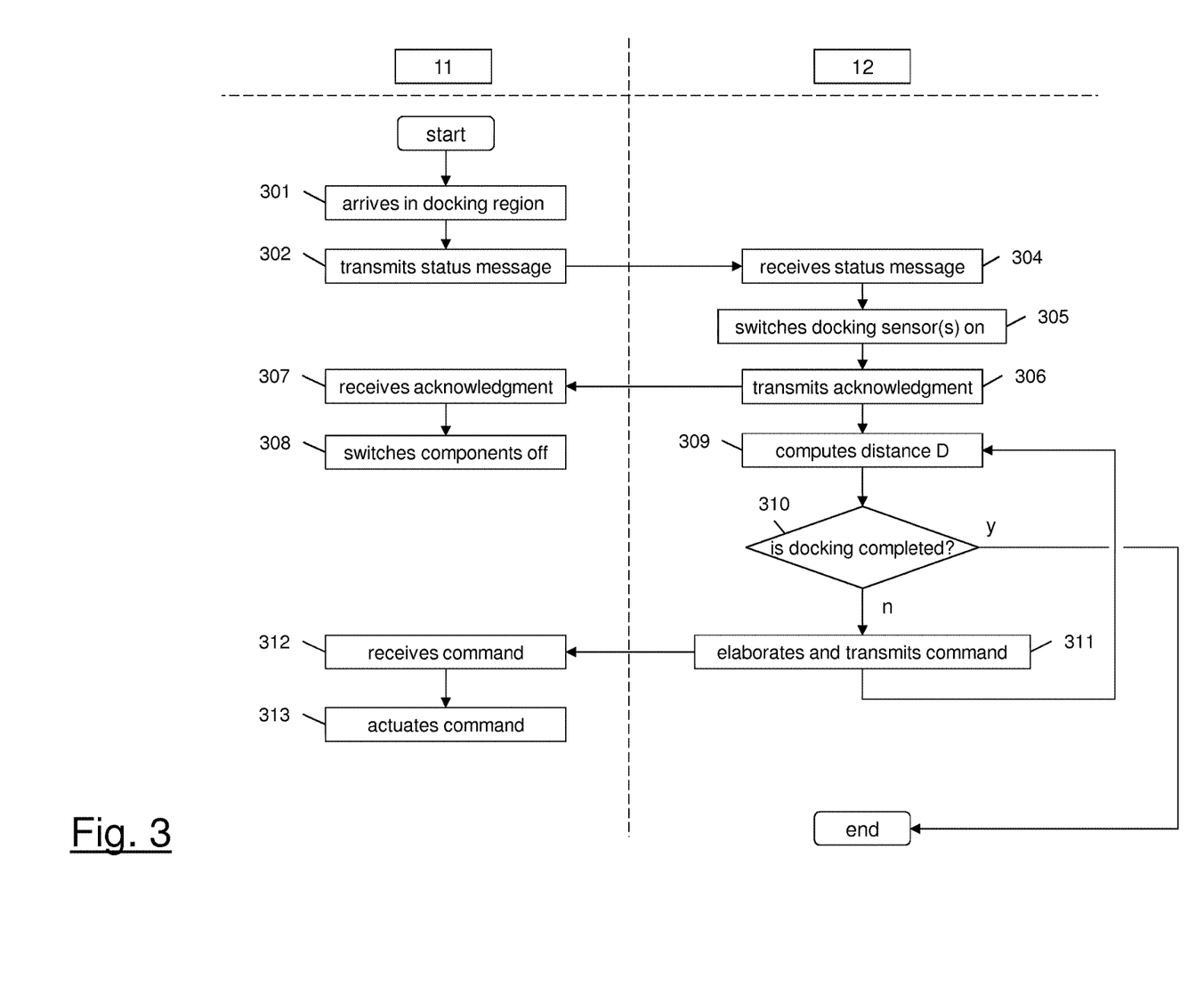
FIG. 3 is a flowchart of the docking method for charging a mobile robot according to the present invention.

According to the method of the present invention, when the charge level of the rechargeable power source of the mobile robot 11 reaches a given threshold, the mobile robot moves towards the docking station 12 thanks to its autonomous navigation system. In particular, the navigation system of the mobile robot 11 determines the position of the mobile robot 11 and computes a route allowing the robot to approach the docking station 12. These operations are typically known in the art and hence they will not be described in greater detail herein after.

Then, according to the present invention, a bidirectional communication link is set up between the docking station 12 and the mobile robot 11 allowing the docking station 12 to drive the mobile robot 11 towards the docking station 12. In order to do this, the docking station 12 preferably uses the one or more docking sensors 224 allowing getting information about the position of the mobile robot 11. Moreover, the present invention provides for switching off most of the mobile robot components during the docking procedure, except the first module 21, the traction motors and the circuitry that is necessary to operate them. These operations will be described in detail herein after.

At step 301 of the method, the mobile robot 11, while approaching the docking station 12 as driven by its autonomous navigation system, arrives at the docking region. In particular, the mobile robot 11 reaches a starting position when its distance D from the docking station 12 becomes equal to or less than the radius R. The time at which the mobile robot 11 reaches the starting position will be referred to in the following description as "starting time" ts. The distance D of the mobile robot 11 from the docking station 12 at the starting time will be referred to as "starting distance" and indicated by "Ds". It may be computed as follows $$Ds = \sqrt{Xs^2 + Ys^2} \quad [1]$$

where Xs and Ys are, respectively, the X coordinate and the Y coordinate of the mobile robot 11 within the reference Cartesian coordinate axes system represented in FIG. 1 at the starting position. In other words, Xs is the distance of the mobile robot's starting position from the docking station 12 along the X (horizontal) axis, and Ys is the distance of the mobile robot's starting position from the docking station 12 along the Y (vertical) axis.

When the mobile robot 11 reaches the starting position, the first control unit 213 preferably generates a status message indicating that the mobile robot 11 needs charging.

The message may be a message according to a Robot Operating System (ROS), in particular according to the ROS messaging rules. Then, the first communication unit 211 preferably sends the status message to the second communication unit 221 of the docking station (step 302) over the wireless communication link established between them. In the meanwhile, the mobile robot 11 preferably stops its one or more traction motors.

As anticipated above, according to an embodiment of the present invention, messages exchanged between the docking station 12 and the mobile robot 11 are carried over wireless signals transmitted over the direct bidirectional wireless communication link that may be established between the first communication unit 211 and the second communication unit 221, using e.g. the Wi-Fi technology. According to advantageous embodiments, messages are transmitted between the first communication unit 211 to the second communication unit 221 over an indirect wireless bidirectional communication link passing though the cloud platform 23.

At step 304, the second communication unit 221 of the docking station 12 receives the status message indicating that the mobile robot 11 needs charging. Upon reception of the status message, the second control unit 223 preferably generates a command for switching on the one or more docking sensors 224. At step 305, the one or more docking sensors 224 preferably switch on and start emitting the corresponding signal(s). Moreover, at step 306, the second communication unit 221 preferably generates an acknowledgment message for the mobile robot 11 indicating that it received the status message sent by the first communication unit 211 at step 302. It is to be noticed that the second communication unit 221 may alternatively generate the acknowledgment message before the docking sensors 224 are switched on. According to other embodiments of the present invention, the docking sensors 224 may be already switched on when the mobile robot 11 enters the docking station (in this case, the flow chart of FIG. 3 does not comprise step 305).

At step 307, the first communication unit 211 preferably receives the acknowledgment message from the second communication unit 221 of the docking station 12. Upon reception of the acknowledgment message, the first control unit 213 preferably generates further commands for the powerboard of the mobile robot 11 in order to switch off a number of components of the mobile robot 11. According to the present invention, most of the components of the mobile robot 11 are switched off at this point, with the exception of the components of the first module 21, in particular the first communication unit 211 and the first control unit 212, the traction motors and the circuitry that drives the traction motors (step 308). In other words, the commands generated by the first control unit 213 at step 308 provide for switching off the components of the mobile robot 11 that are not necessary for the mobile robot 11 to approach the docking station 12 and dock on it, while keeping switched on the components that are necessary for the docking procedure, i.e. the components of the first module 21. the traction motors and the circuitry that drives the traction motors. In particular, the mobile robot 11 switches off its autonomous navigation unit comprising the processor and the navigation sensors.

The procedure of exchanging the status message and the acknowledgment message may be implemented according to the ROS messaging rules by invoking a ROS service, which, as known, is a client-server synchronous mechanism. In this case, the mobile robot 11 acts as a client by invoking the ROS service (which corresponds to sending the status message) and waits for the answer (which corresponds to the acknowledgment message) from a server (i.e. the docking station 12).

At this point, the docking station 12 starts using the docking sensor(s) 224 to detect the position of the mobile robot 11 within the docking region and generate corresponding traction commands to let the mobile robot 11 approach the docking station 12 and connect to it. The operations performed by the docking station 12 and the mobile robot 11 are the following:

the docking station 12 uses data received from its docking sensor(s) 224 to compute the distance of the mobile robot 11;

the docking station 12 generates and sends to the mobile robot 11 a traction command allowing the mobile robot 11 to approach the docking station 12; and the mobile robot 11 receives the traction command and moves accordingly.

This sequence of operations described above is iterated until the mobile robot 11 docks on the docking station. The procedure summarized above will be now described in greater detail with reference to the blocks of FIG. 2 and the flow chart of FIG. 3. It is to be noticed that iterations involve steps 309-313 of the flowchart of FIG. 3, as it will be clearer from the following lines.

At step 309, on the basis of the data received by the docking sensor(s) 224, the second control unit 223 preferably computes a distance between the docking station 12 and the mobile robot 11. In correspondence of a time t is (namely, at the starting time or after the starting time) the distance D(t) is computed as the distance between the docking station 12 and the position of the mobile robot 11, as follows:

$$D(t)=\sqrt{X(t)^2+Y(t)^2} \quad [2]$$

where X(t) and Y(t) are, respectively, the X coordinate and the Y coordinate of the mobile robot 11 within the reference Cartesian coordinate axes system represented in FIG. 1 at time t. In particular, the first data received by the docking sensor(s) 224 after the mobile robot 11 has reached the docking region correspond to a distance D(ts) substantially equal to the starting distance Ds of equation [1].

Moreover, at step 309 on the basis of the data received by the docking sensor(s) 224, the second control unit 223 preferably computes an orientation θ between the docking station 12 and the mobile robot 11. In correspondence of a time t after the mobile robot 11 has reached the starting position, the orientation θ(t) is computed, according to an embodiment of the present invention, as the angle between the Y axis and the straight line connecting the position of the docking station 12 and the position of the mobile robot 11 at time t.

At step 310, a check is preferably performed to determine whether the mobile robot 11 has docked on the docking station 12. The check is performed by determining whether an electrical connection has been established between the first electrical contacts of the first power handling module 212 on board the mobile robot 11 and the second electrical contacts of the second power handling module 222 on board the docking station 12. When the electrical connection is established, the second power handling module 222 preferably communicate with the second control unit 223 to indicate that the mobile robot 11 has docked on the docking station 12.

In case the check of step 310 is affirmative, the procedure ends.

If, at step 310, the check is negative indicating that the mobile robot 11 has not already docked on the docking station, the second control unit 223, at step 311, preferably computes a translational speed V(t) for the mobile robot as follows:

$$V(t)=K_V \times D(t) \qquad [3]$$

where D(t) is the distance computed at step 306 and $K_V$ is a speed adjustment coefficient. The speed coefficient $K_V$ may have a value comprised between 0 and 1, for instance 1. In particular, the value of the speed adjustment coefficient $K_V$ may vary as a function of the distance D(t). More in particular, the speed adjustment coefficient $K_V$ may be, for instance, directly proportional to the distance D(t) so that it decreases as the distance D(t) decreases and provide for slowing down the mobile robot 11 as it approaches the docking station 12.

Moreover, if, at step 310, the check is negative indicating that the mobile robot 11 has not already docked on the docking station, the second control unit 223, at step 308, preferably computes a rotational speed W(t) for the mobile robot as follows:

$$W(t)=K_W \times \theta(t) \qquad [4]$$

where θ(t) is the orientation computed at step 306 and $K_W$ is an angular coefficient. The angular coefficient $K_W$ may have a value comprised between 0 and 1, for instance it may be equal to 1. In particular, the value of the angular coefficient $K_W$ may vary as a function of the distance D(t). For instance, it may be directly proportional to the distance D(t) so that it decreases as the distance D(t) decreases and provides for driving the mobile robot 11 to rotate more slowly as it approaches the docking station 12.

Then, at step 311, the computed values of translational speed V(t) and rotational speed W(t) are preferably used by the second control unit 223 to generate one or more traction commands for the mobile robot 11. A traction command is a command suitable for driving the mobile robot 11 to move according to the computed values of translational speed and/or rotational speed. A first traction command may be generated containing the computed translational speed V(t) and a second traction command may be generated containing the computed rotational speed W(t). The traction commands are preferably introduced in a command message that is subsequently sent by the second communication unit 221 to the first communication unit 211 on board the mobile robot 11 over the established communication link. For instance, the command message may be a message according to the Robot Operating System (ROS) messaging rules. The docking station 12 may publish the command message to a topic, for instance the /cmd_vel topic, which is typically used by a mobile robot to get traction commands. The command message used for the traction commands may be the Twist message of the geometry_msgs packet.

At step 312, the command message is received by the first communication unit 221 on board the mobile robot 11. Then, the first control unit 221 preferably processes the command message, extracts the traction commands and uses them to generate control signals to operate the traction motors of the mobile robot 11 in accordance with the traction commands (step 313). In this way, the traction commands are actuated by the traction motors so that the mobile robot 11 performs a linear translation and/or a rotational movement allowing it to approach the docking station 12.

While the mobile robot 11 is moving towards the docking station 12, the docking station 12 preferably iteratively repeats steps 309, 310 and 311. In this way, the docking station 12 monitors the position of the mobile robot 11 within the docking region and drives the mobile robot 11 towards the docking station 12. Steps 309-311 are preferably repeated until the mobile robot 11 docks on the docking station 12. In particular, as described above, Steps 309-311 are preferably repeated until an electrical connection is established between the first electrical contacts of the first power handling module 212 on board the mobile robot 11 and the second electrical contacts of the second power handling module 222 on board the docking station 12.

The present invention provides an "intelligent" system comprising modules to be installed on board the mobile robot 11 and the docking station 12, the modules allowing to establish a bidirectional connection between the mobile robot 11 and the docking station 12. Hence, the mobile robot 11 may communicate to the docking station 12 that it has reached the docking region and the docking station 12 may drive the mobile robot 11 within the docking region. In order to do so, the docking station 12 emits docking signals which allow determining the instantaneous position of the mobile robot 11. Advantageously, the docking signals may be emitted by the docking station 12 only upon arrival of the mobile robot 11 in the docking region, thus saving energy. Moreover, advantageously, the bidirectional connection between the mobile robot 11 and the docking station 12 may be established through a cloud computing platform, which may allow providing great computational resources.

Moreover, the present invention advantageously allows saving energy on board the mobile robot 11. This is particularly advantageous in those cases where the level of the on-board battery of the mobile robot is critically low and it has to approach the docking station for recharging. Indeed, as described above, thanks to the present invention, the mobile robot 11 may switch off all its components (except the first module 21, its traction motors and the circuitry that drives them) while approaching the docking station 12 within the docking region and this allows saving a significant amount of energy. For sake of example, it is assumed that the mobile robot 12 carries a laser scanner as navigation sensor. The laser scanner is powered by the 12 V on-board battery of the mobile robot 11 and may consume a current equal to 1 A. Therefore, the power consumed by the laser scanner is 12 V×1 A=12 W. The processor of the autonomous navigation unit may consume a power equal to 30 W. Therefore, the mobile robot 11 may consume an overall power at least equal to 42 W when its autonomous navigation unit is active. According to the present invention, the power computed here above may be saved when the mobile robot 11 enters the docking region and switches off the autonomous navigation unit. Considering a time interval of about 60 seconds as the time needed for the mobile robot 11 to dock on the docking station 12 after it enters the docking region, saving 42 W of electrical power means saving 42 W×60 s=2520 J of energy, i.e. 2.5 kJ per minute. In other words, it means saving 42 W/12 V=3.5 A of supply current from the on-board battery.

The invention claimed is:

1. A docking system for charging a mobile robot at a docking station, the system comprising:
   a first module configured to be installed on board the mobile robot; and
   a second module configured to be installed on board the docking station;
   the first module comprising a first communication unit and a first control unit, the second module comprising a second communication unit, one or more docking sensors and a second control unit; wherein:

when the mobile robot enters a docking region around the docking station, the first communication unit is configured to send to the second communication unit a status message indicating that the mobile robot needs charging;

the second control unit is configured to, upon reception of the status message, use the one or more docking sensors, the one or more sensors detecting a position of the mobile robot away from the docking station, to derive, based on data received by the one or more docking sensors, a traction command to drive the mobile robot towards the docking station; and the second communication unit is configured to send to the first communication unit a command message containing the traction command; and wherein the first control unit is configured to process the traction command and use the traction command to operate one or more traction motors of the mobile robot.

2. The docking system according to claim 1, wherein the second communication unit is configured to, upon reception of the status message, send to the first communication unit an acknowledgment message.

3. The docking system according to claim 2, wherein the second control unit is further configured to command switching off components of the mobile robot, while keeping switched on at least the first module, the one or more traction motors, and circuitries driving them.

4. The docking system according to claim 1, wherein the second control unit is configured to, upon reception of the status message, switch on the one or more docking sensors.

5. The docking system according to claim 1, wherein the data received by the one or more docking sensors comprise a distance and an orientation between the mobile robot and the docking station, and wherein the command message comprises a translational speed and/or a rotational speed to be actuated by the one or more traction motors of the mobile robot, the translational speed being computed based on the distance and the rotational speed being computed based on the orientation.

6. The docking system according to claim 1, wherein the status message and the command message are messages according to Robot Operating System (ROS) rules.

7. The docking system according to claim 1, wherein, until the mobile robot docks on the docking station:

the second control unit is further configured to cyclically derive, based on further data received by the one or more docking sensors, a further traction command;

the second communication unit is further configured to cyclically send to the first communication unit a further command message containing the further traction command; and the first control unit is further configured to cyclically process the further traction command and use the traction command to operate the one or more traction motors of the mobile robot.

8. The docking system according to claim 7, wherein the first module comprises a first power handling unit with first electrical contacts configured to establish an electrical connection with second electrical contacts of a second power handling unit of the second module when the mobile robot docks on the docking station.

9. The system according to claim 1, wherein the first communication unit and the second communication unit are configured to establish a connection according to a wireless communication technology, the wireless communication technology being one of WiFi, 4G LTE.

10. The system according to claim 1, wherein the first communication unit and the second communication unit are configured to establish a connection through a cloud computing platform.

11. A method for charging a mobile robot at a docking station, the method comprising:

a) when the mobile robot enters a docking region around the docking station, sending by the mobile robot to the docking station a status message indicating that the mobile robot needs charging;

b) at the docking station, upon reception of the message, using one or more docking sensors, the one or more sensors detecting a position of the mobile robot away from the docking station, to derive, based on data received by the one or more docking sensors, a traction command to drive the mobile robot towards the docking station;

c) at the docking station, sending to the mobile robot a command message containing the traction command; and d) at the mobile robot, processing the traction command and using it to operate one or more traction motors of the mobile robot.

12. The method according to claim 11, further comprising, at the docking station, upon reception of the status message, sending to the mobile robot an acknowledgment message, and, at the mobile robot, upon reception of the acknowledgment message, switching off components of the mobile robot, while keeping switched on at least the first module, the one or more traction motors and circuitries driving them.

13. The method according to claim 11, wherein b) to d) are cyclically repeated until the mobile robot docks on the docking station.

14. The method according to claim 13, wherein b) to d) are cyclically repeated until first electrical contacts of the mobile robot establish an electrical connection with second electrical contacts of the docking station.

15. The method according to claim 11, wherein the docking region is a circular region around the docking station of radius between 1 meter and 10 meters.

* * * * *